United States Patent
Xia et al.

(10) Patent No.: US 10,417,274 B2
(45) Date of Patent: Sep. 17, 2019

(54) METHOD AND APPARATUS FOR PUSHING INFORMATION

(71) Applicant: Baidu Online Network Technology (Beijing) Co., Ltd., Beijing (CN)

(72) Inventors: Yuan Xia, Beijing (CN); Jingbo Zhou, Beijing (CN); Haishan Wu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 313 days.

(21) Appl. No.: 15/606,204

(22) Filed: May 26, 2017

(65) Prior Publication Data

US 2018/0129660 A1 May 10, 2018

(30) Foreign Application Priority Data

Nov. 10, 2016 (CN) .......................... 2016 1 1039373

(51) Int. Cl.
*G06F 16/487* (2019.01)
*G06Q 10/04* (2012.01)
*G06Q 50/30* (2012.01)
*G08G 1/00* (2006.01)

(52) U.S. Cl.
CPC ......... *G06F 16/487* (2019.01); *G06Q 10/047* (2013.01); *G06Q 50/30* (2013.01); *G08G 1/202* (2013.01)

(58) Field of Classification Search
CPC .... G06F 16/487; G06Q 10/047; G06Q 50/30; G08G 1/202
USPC ......................................................... 701/409
See application file for complete search history.

(56) References Cited

U.S. PATENT DOCUMENTS 9,218,819 B1 * 12/2015 Stekkelpak ............. G10L 15/22
2015/0168150 A1 * 6/2015 Kahn ..................... H04W 4/21
701/408

* cited by examiner

*Primary Examiner* — Isaac G Smith
(74) *Attorney, Agent, or Firm* — Nixon Peabody LLP

(57) ABSTRACT

A method and apparatus for pushing information. A specific embodiment of the searching method comprises: analysing, based on a second search operation sequentially performed to a map application installed on a client by a user, a search term corresponding to the second search operation; matching the analysed search term with a first search term in a first search term sequence to determine whether the matching is successful; acquiring log data of the map application installed on the client, in response to the matching being successful; determining a vehicle demand probability of the user based on the log data, acquired feature information of the user and a pre-trained vehicle demand probability model; and pushing information to the client in response to the determined vehicle demand probability being greater than a preset vehicle demand probability threshold.

17 Claims, 6 Drawing Sheets

METHOD AND APPARATUS FOR PUSHING INFORMATION

CROSS-REFERENCE TO RELATED APPLICATION

This application is related to and claims priority from Chinese Application No. 201611039373.5, filed on Nov. 10, 2016, entitled "Method and Apparatus for Pushing Information" the entire disclosure of which is hereby incorporated by reference.

TECHNICAL FIELD

The present disclosure relates to the field of computer technology, specifically to the field of Internet technology, and more specifically to a method and apparatus for pushing information.

BACKGROUND

With the development and popularization of the Internet, mobile Internet-based vehicle use is growing. In order to enhance the user's experience and improve competitiveness, it is usually necessary to acquire user information to determine the user's travel situation, infer the user's vehicle demand, and then push relevant information (such as travel coupons, etc.).

However, the existing information pushing method targeting the user's travel situation is usually based on the user's historical travel data to predict the user's vehicle demand probability, and then push the relevant information. This information pushing method cannot predict the user's vehicle demand and the relevant situation at the present time, resulting in insufficient timeliness and lack of pertinence of the information push.

SUMMARY

The present disclosure provides an improved method and apparatus for pushing information, in order to solve the technical problem mentioned in the foregoing Background section.

In a first aspect, the present disclosure provides a method for pushing information, comprising: analysing, based on a second search operation sequentially performed to a map application installed on a client by a user, a search term corresponding to the second search operation; matching the analysed search term with a first search term in a first search term sequence to determine whether the matching is successful, wherein the first search term sequence is generated based on a first search operation sequence for the map application; acquiring log data of the map application installed on the client, in response to the matching being successful; determining a vehicle demand probability of the user based on the log data, acquired feature information of the user and a pre-trained vehicle demand probability model, the vehicle demand probability model being used to characterize a correspondence relationship between the log data, the feature information and the vehicle demand probability; and pushing information to the client in response to the determined vehicle demand probability being greater than a preset vehicle demand probability threshold.

In some embodiments, before the analysing a search term corresponding to the second search operation based on the second search operation, the method further comprises: acquiring map search data, wherein the map search data includes a search term and a timestamp corresponding to each search operation of a plurality of search operations performed in the map application; performing sequence pattern mining to the map search data based on a sequence pattern mining algorithm, to determine a first search term sequence; determining a search operation corresponding to each first search term in the first search term sequence as a first search operation, to determine the first search operation sequence; and storing the first search term sequence.

In some embodiments, the matching the analysed search term with a first search term in a first search term sequence to determine whether the matching is successful includes: for each second search operation sequentially performed, if a search term corresponding to the second search operation matches with the first search term corresponding to the first search operation in the first search term sequence, determining the matching being successful.

In some embodiments, the matching the analysed search term with a first search term in a first search term sequence to determine whether the matching is successful includes: if a search term corresponding to the second search operation does not match with the first search term corresponding to the first search operation in the first search term sequence, determining the matching being unsuccessful.

In some embodiments, the method further comprises: acquiring a preset travel scene identifier set and a matching relationship between a preset first search term sequence and a travel scene identifier, in response to determining the matching being successful; extracting a travel scene identifier matching the first search term sequence from the travel scene identifier set based on the matching relationship between the first search term sequence and the travel scene identifier; acquiring a preset candidate information set and a matching relationship between a preset travel scene identifier and candidate information; and extracting the candidate information matching the travel scene identifier from the candidate information set based on the matching relationship between the travel scene identifier and the candidate information, and determining the extracted candidate information as information to be pushed to the client.

In some embodiments, the determining a vehicle demand probability of the user based on the log data, acquired feature information of the user and a pre-trained vehicle demand probability model includes: extracting a feature vector from the log data and the acquired feature information of the user; and introducing the feature vector into a pre-trained vehicle demand probability model to determine the vehicle demand probability of the user.

In some embodiments, the vehicle demand probability model is obtained through the following steps: acquiring the feature information and the vehicle demand probability of a plurality of users; acquiring log data matching the plurality of users in a historical setting duration from the map application; extracting a feature vector matching each of the plurality of users from the acquired feature information of the plurality of users and the log data; and training the vehicle demand probability model by using the extracted feature vector as an input and using the acquired vehicle demand probability as an output.

In some embodiments, after the pushing information to the client, the method further comprises: acquiring a user identifier associated with the user; and storing the user identifier to a pushed user identifier list.

In a second aspect, the present disclosure provides an apparatus for pushing information, comprising: an analysing unit, configured to analyse, based on a second search operation sequentially performed to a map application installed on a client by a user, a search term corresponding to the second search operation; a matching unit, configured to match the analysed search term with the search term in a first search term sequence to determine whether the matching is successful, wherein the first search term sequence is generated based on a first search operation sequence for the map application; a first acquisition unit, configured to acquire log data of the map application installed on the client, in response to the matching being successful; a first determination unit, configured to determine a vehicle demand probability of the user based on the log data, the acquired feature information of the user and a pre-trained vehicle demand probability model, wherein the vehicle demand probability model is used to characterize a correspondence relationship between the log data, the feature information and the vehicle demand probability; and a pushing unit, configured to push information to the client in response to the determined vehicle demand probability being greater than a preset vehicle demand probability threshold.

In some embodiments, the apparatus further comprises: a second acquisition unit, configured to acquire map search data, wherein the map search data includes a search term and a timestamp corresponding to each search operation of a plurality of search operations performed in the map application; a mining unit, configured to perform sequence pattern mining to the map search data based on a sequence pattern mining algorithm, to determine a first search term sequence; a second determination unit, configured to determine a search operation corresponding to each first search term in the first search term sequence as a first search operation, to determine the first search operation sequence; and a first storing unit, configured to store the first search term sequence.

In some embodiments, the matching unit is further configured to: for each second search operation sequentially performed, if a search term corresponding to the second search operation matches with the first search term corresponding to the first search operation in the first search term sequence, determine the matching being successful.

In some embodiments, the matching unit is further configured to: if a search term corresponding to the second search operation does not match with the first search term corresponding to the first search operation in the first search term sequence, determine the matching being unsuccessful.

In some embodiments, the apparatus further comprises: a third acquisition unit, configured to acquire a preset travel scene identifier set and a matching relationship between a preset first search term sequence and a travel scene identifier, in response to determining the matching being successful; a first extraction unit, configured to extract a travel scene identifier matching the first search term sequence from the travel scene identifier set based on the matching relationship between the first search term sequence and the travel scene identifier; a fourth acquisition unit, configured to acquire a preset candidate information set and a matching relationship between a preset travel scene identifier and candidate information; a second extraction unit, configured to extract the candidate information matching the travel scene identifier from the candidate information set based on the matching relationship between the travel scene identifier and the candidate information, and determining the extracted candidate information as information to be pushed to the client.

In some embodiments, the first determination unit is further configured to: extract a feature vector from the log data and the pre-acquired feature information of the user; and introduce the feature vector into a pre-trained vehicle demand probability model to determine the vehicle demand probability of the user.

In some embodiments, the vehicle demand probability model is obtained by the following units: a fifth acquisition unit, configured to acquire the feature information and the vehicle demand probability of a plurality of users; a sixth acquisition unit, configured to acquire log data matching the plurality of users in a historical setting duration from the map application; a third extraction unit, configured to extract a feature vector matching each of the plurality of users from the acquired feature information of the plurality of users and the log data; and a training unit, configured to train the vehicle demand probability model by using the extracted feature vector as an input and using the acquired vehicle demand probability as an output.

In some embodiments, the apparatus further comprises: a seventh acquisition unit, configured to acquire a user identifier associated with the user; and a second storing unit, configured to store the user identifier to a pushed user identifier list.

By analysing the search term corresponding to the second search operation performed by the user on the map application, matching the analysed search term with the first search term in the first search term sequence, upon a successful matching, acquiring log data of the map application, then determining the vehicle demand probability of the user based on the log data, the acquired feature information of the user and the pre-trained vehicle demand probability model, and finally pushing information to the client if the vehicle demand probability of the user is greater than the preset vehicle demand probability threshold, the method and apparatus for pushing information provided by the present disclosure achieves a targeted information pushing.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
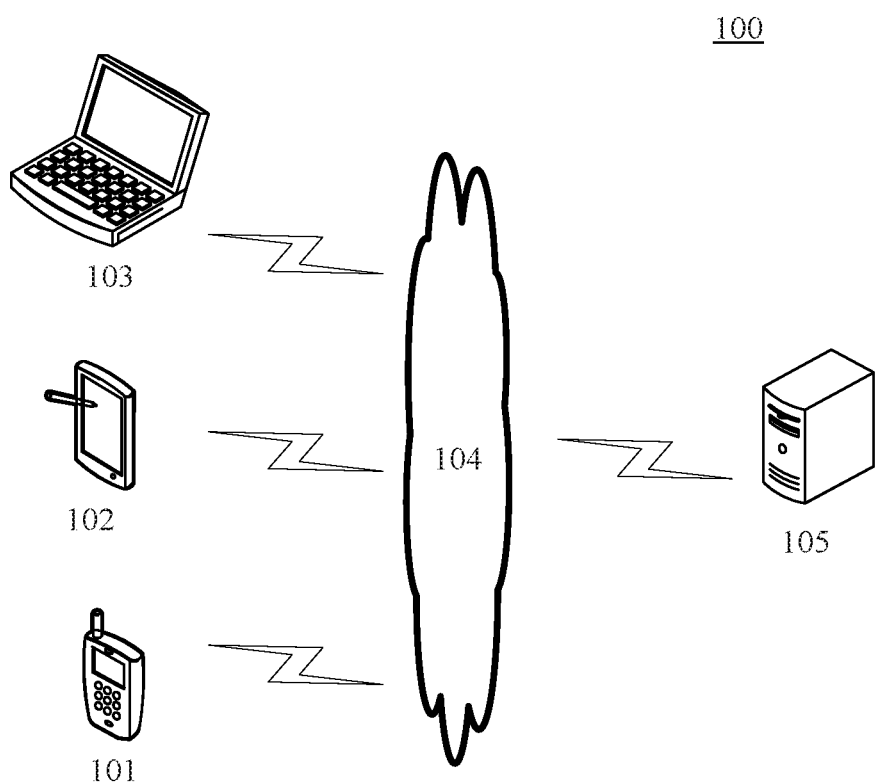
FIG. 1 is an exemplary system architecture diagram in which the present disclosure may be applied.

FIG. 1 shows an exemplary architecture of a system 100 which may be used by a method and apparatus for pushing information according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Map client applications may be installed on the terminal devices 101, 102 and 103.

The terminal devices 101, 102 and 103 may be various electronic devices having display screen and supporting location retrieval, including but not limited to, smart phones, tablet computers and laptop computers.

The server 105 may be a server providing various services, for example, a backend server providing support on the map client application running on the terminal devices 101, 102 or 103. The backend web server may perform processing such as matching, analysing to the received search information corresponding to the received search operation applied to the map, or acquire log data of the map client application from the terminal devices 101, 102 and 103 and determine the user's vehicle demand probability, and push information to the terminal devices 101, 102 and 103 according to the vehicle demand probability.

It should be noted that the method for pushing information provided by the embodiments of the present application is generally executed by the server 105, and accordingly, an information pushing apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
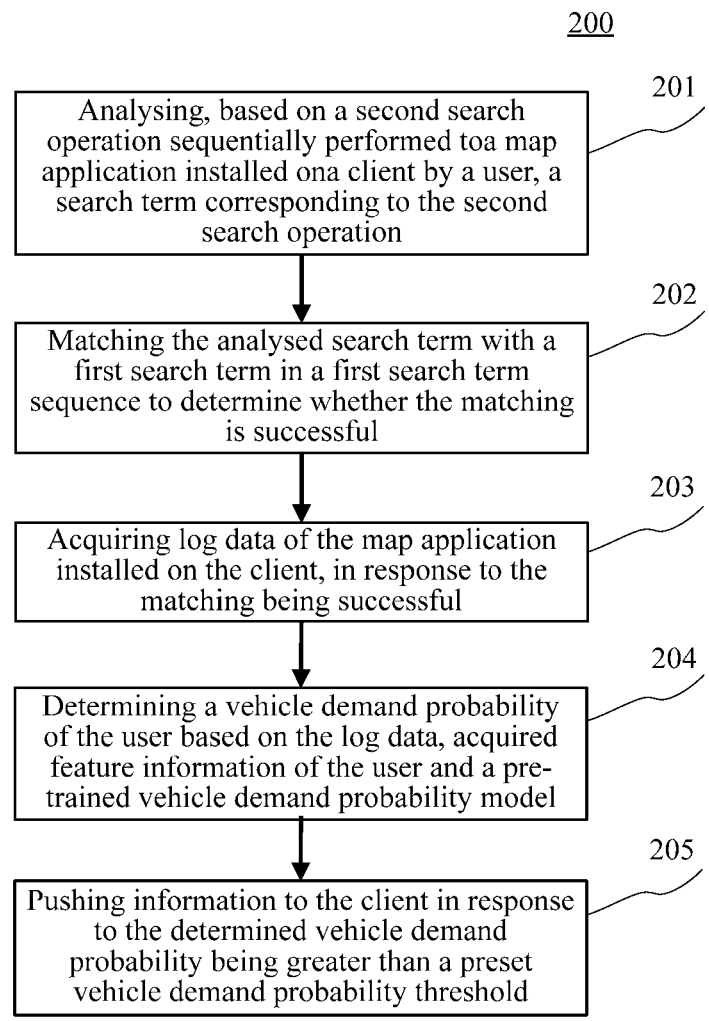
FIG. 2 is a flowchart of an embodiment of a method for pushing information according to the present disclosure.

With further reference to FIG. 2, a flow 200 of an embodiment of the method for pushing information according to the present disclosure. The method for pushing information includes the following steps:

Step 201, analysing, based on a second search operation sequentially performed to a map application installed on a client by a user, a search term corresponding to the second search operation.

In the present embodiment, an electronic device (e.g., the terminal devices 101, 102 and 103 as illustrated in FIG. 1) on which the method for pushing information operate may analyse a search term corresponding to the second search operation, based on a second search operation performed sequentially by a user on a map application installed on a client. Here, the second search operation may include an operation of the user inputting a location information in the map application and a click-search operation after the input of the location information. The operation of inputting the location information may be manual input of the location information or speech input of the location information.

Figure 3:
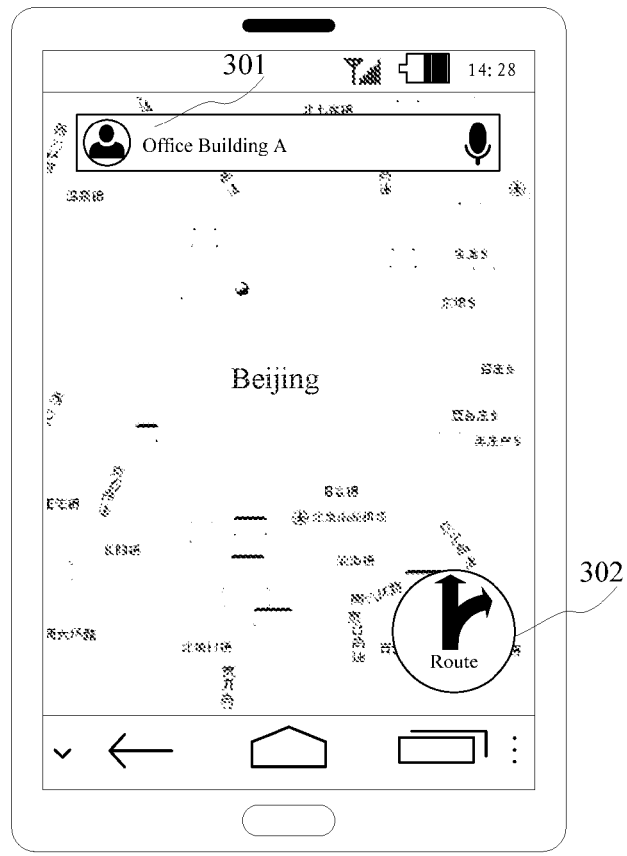
FIG. 3 is a schematic effect diagram in a display interface of an open map application according to the present disclosure.

In practice, the user may first open the map application installed by the client. As shown in FIG. 3, FIG. 3 is a schematic effect diagram in a display interface of an open map application. A second clicking operation performed by the user on the map application may proceed as follows: the first step, executing the operation of inputting the location information, that is, manually inputting the location information "office building A" at the search position 301 in the display interface of the map application; the second step, performing a click-search operation, that is, click on the "route" button 302 in the display interface of the map application.

In the present embodiment, after the user performing each of the second search operation on the map application installed by the client, the electronic device may acquire, from the client, the location information input by the user when performing the second search operation and the timestamp of the click-search operation, or acquire, from the client, the real-time position information of the user when performing the second search operation. The real-time position information may be extracted from the operation data of the map application based on the real-time positioning function of the map application, or may be acquired based on the real-time positioning function turned on by other applications installed by the client.

In the present embodiment, for each of the second search operation performed by the user on the map application installed by the client, the electronic device analyses the search term corresponding to the second search operation by performing the following steps:

First, the electronic device may acquire the location information input by the user when performing the second search operation.

After that, the electronic device may determine the POI information matched with the location information based on the preset location information and a mapping table of the POI (Point of Interest) information. For example, the location information is "office building A" or "office building B", and the "office building A" and/or "office building B" in the mapping table is mapped to the POI information "business building", so that the POI information matching the location information may be determined as "business building" based on the mapping table. It should be noted that the POI information may include a POI information identifier, and the POI information identifier may be a character string composed of arbitrary characters for uniquely identifying the POI information.

Finally, the POI information is determined as the search term corresponding to the second search operation.

Step 202, matching the analysed search term with a first search term in a first search term sequence to determine whether the matching is successful.

In the present embodiment, the electronic device may pre-acquire a first search term sequence. The first search term sequence may be stored in a database installed in the electronic device. Here, the electronic device may acquire the first search term sequence directly from the local database; the first search term sequence may also be stored in another database connected to the electronic device, wherein the electronic device may look for and acquire the first search term sequence from the other database via a wired connection method or a wireless connection method. The wireless connection may include, but is not limited to, 3G/4G connection, WiFi connection, bluetooth connection, WiMAX connection, Zigbee connection, UWB (ultra wideband) connection, and other wireless connections known by now or to be developed in the future.

In the present embodiment, the first search term sequence may be generated based on a first search operation sequence applied to the same map application. Here, the first search operation sequence may be a sequence composed of first search operations sequentially performed by any user on the same map application in chronological order, and the first search operation performed each time may include an operation of inputting the location information in the same map application and a click-search operation after the input of the location information. Here, the any user may be at least one or a plurality of users. It should be noted that the first search operation sequence may be one or a plurality of sequences. Correspondingly, the first search term sequence may also be one or a plurality of sequences.

In the present embodiment, the electronic device may match the search term analysed in step 201 with the first search term in the first search term sequence. Specifically, the electronic device may match the search term corresponding to the second search operation with the search term corresponding to the first search operation of the same sequence with the second search operation in the first search term sequence. For example, if the search term analyzed based on the $N^{th}$ second search operation is m1, the electronic device may compare whether the m1 coincides with the search term m2 generated based on the $N^{th}$ first search operation, wherein N is an integer not less than 1.

In some alternative implementations of the present embodiment, it is possible to determine whether the matching is successful based on the following method: if the search term corresponding to the second search operation matches with the first search term corresponding to the relevant first search operation in the first search term sequence for each of the second search operations sequentially performed, the electronic device may determine the matching as successful. That is, only the search terms analysed based on each of the second search operations match with the first search term generated based on the first search operation of the same sequence, the matching can be determined as successful.

In some alternative implementations of the present embodiment, it is possible to determine whether the matching is successful based on the following method: if the search term corresponding to the second search operation does not match with the first search term corresponding to the relevant first search operation in the first search term sequence, the electronic device may determine the matching as unsuccessful. That is, as long as any of the search terms analysed based on the second search operation does not match with the search terms generated based on the first search operation of the same sequence, the matching may be determined as unsuccessful. When the matching is unsuccessful, the matching of the search terms corresponding to the next second search operation is not further performed.

Step 203, acquiring log data of the map application installed by the client, in response to a successful matching.

In the present embodiment, the electronic device may acquire log data of the map application installed by the client in step 201, in response to a successful matching determined in step 202. In practice, the log data may include, but is not limited to the coordinates of the current location of the user, the coordinates of the destination, the distance of the current location of the user to the destination, the current time, etc.

Step 204, determining a vehicle demand probability of the user based on the log data, the acquired feature information of the user and a pre-trained vehicle demand probability model.

In the present embodiment, the electronic device may first acquire feature information of the user from the various applications installed locally or by the client, for example, the age, sex, consumption level of the user, etc. Then, the pre-trained vehicle demand probability model may be loaded. Finally, it is possible to determine the user's vehicle demand probability based on the log data acquired in step 203, the acquired feature information of the user and the pre-trained vehicle demand probability model. It should be noted that the vehicle demand probability model may be used to characterize a correspondence relationship between the log data, the feature information and the vehicle demand probability.

In some alternative implementations of the present embodiment, based on the log data, the acquired feature information of the user and the pre-trained vehicle demand probability model acquired in step 203, the vehicle demand probability of the user may be determined according to the following steps: first, the electronic device may select a preset type of data from the log data and the feature information; after that, the electronic device may process the selected data (for example, data type conversion, scaling, etc.) to obtain the processed data; then the electronic device may constitute a feature vector with the processed data, wherein the feature vector may include a plurality of numerical values; finally, the electronic device may introduce the feature vector into the pre-trained vehicle demand probability model to determine the vehicle demand probability of the user.

In some alternative implementations of the present embodiment, the pre-trained vehicle demand probability model is obtained through the following steps: first, the electronic device may acquire the feature information and the vehicle demand probability of a plurality of users; after that, the electronic device may acquire the log data of the map application matched with the user in a historical setting duration from the client used by each user of the plurality of users, wherein the map application is identical to the map application in step 201; then, for each user, the electronic device may extract a feature vector matched with the user from the feature information of the user and the log data matched with the user; finally, for each user, the electronic device may train the vehicle demand probability model with the feature vector matched with the user as an input and the vehicle demand probability of the user as an output.

Step 205, pushing information to the client in response to the determined vehicle demand probability greater than a preset vehicle demand probability threshold.

In the present embodiment, the preset vehicle demand probability threshold may be stored in the electronic device. In response to the determined vehicle demand probability of the user in step 204 greater than the vehicle demand probability threshold, the electronic device may push information to the client used by the user. It should be noted that the information may be various information, for example, chauffeured car special offer information, express car special offer information, carpool special offer information, hitchhike special offer information, etc.

Figure 4:
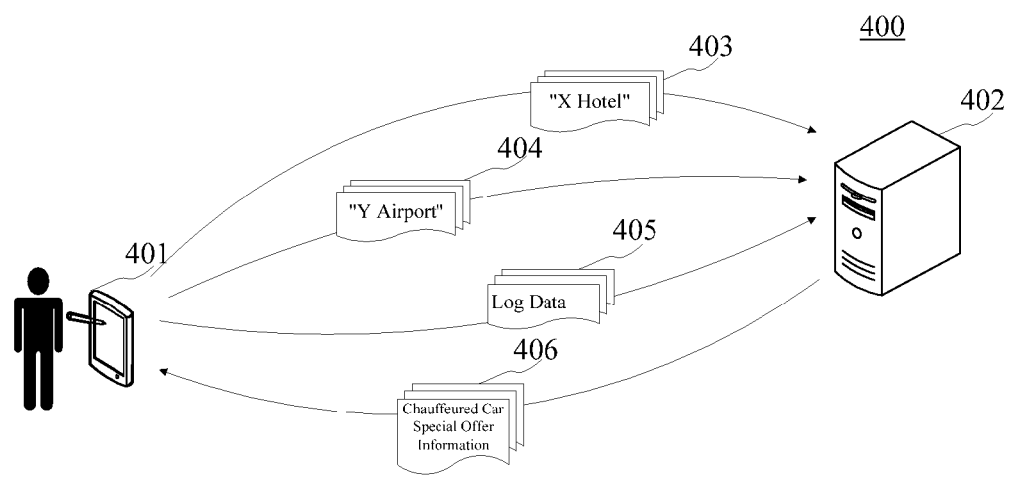
FIG. 4 is a schematic diagram of an application scenario of the method for pushing information according to the present disclosure.

With further reference to FIG. 4, FIG. 4 is a schematic diagram of an application scenario of the method for pushing information according to the present embodiment.

In the application scenario of FIG. 4, the user first performs a first time second search operation on the map application installed by the mobile phone terminal 401. After that, the backend server 402 providing support for the map application acquires the location information input by the user in the first time second search operation from the mobile phone terminal 401, such as the "X hotel" as indicated by reference numeral 403, and analyses the location information "X hotel" as the search term "hotel". Then, the backend server 402 matches the analysed search term "hotel" with the first of the first search terms of the plurality of first search term sequences generated in advance to determine that there is a successfully matched the first of the first search terms, and determine the first search term sequence to which the successfully matched the first of the first search term belongs.

When the user performs a second time second search operation on the map application installed by the mobile phone terminal 401, the backend server 402 first acquires the location information input by the user in the second time second search operation from the mobile phone terminal 401, such as the "Y airport" as indicated by reference numeral 404, and analyses the location information "Y airport" as the search term "airport". Then, the backend server 402 matches the analysed search term "airport" with the second first search term of the determined first search term sequence, when the search term "airport" matches successfully with the second first search term, the backend server 402 determines a third first search term does not exist in the first search term sequence, and determines that the analysed search term matches successfully with the first search term sequence.

After the matching is successful, the backend server 402 first acquires the log data 405 of the map application installed by the mobile phone terminal 401, then determines the vehicle demand probability of the user based on the log data, the acquired feature information of the user and the pre-trained vehicle demand probability model, and finally pushes the chauffeured car special offer information as indicated by the reference numeral 406 to the mobile phone terminal 401, after determining the vehicle demand probability greater than the preset vehicle demand probability threshold.

By analysing the search term corresponding to the second search operation performed by the user on the map application, matching the analysed search term with the first search term in the first search term sequence, upon a successful matching, acquiring log data of the map application, then determining the vehicle demand probability of the user based on the log data, the acquired feature information of the user and the pre-trained vehicle demand probability model, and finally pushing information to the client if the vehicle demand probability of the user is greater than the preset vehicle demand probability threshold, the method provided by the embodiment of the present disclosure achieves a targeted information pushing.

Figure 5:
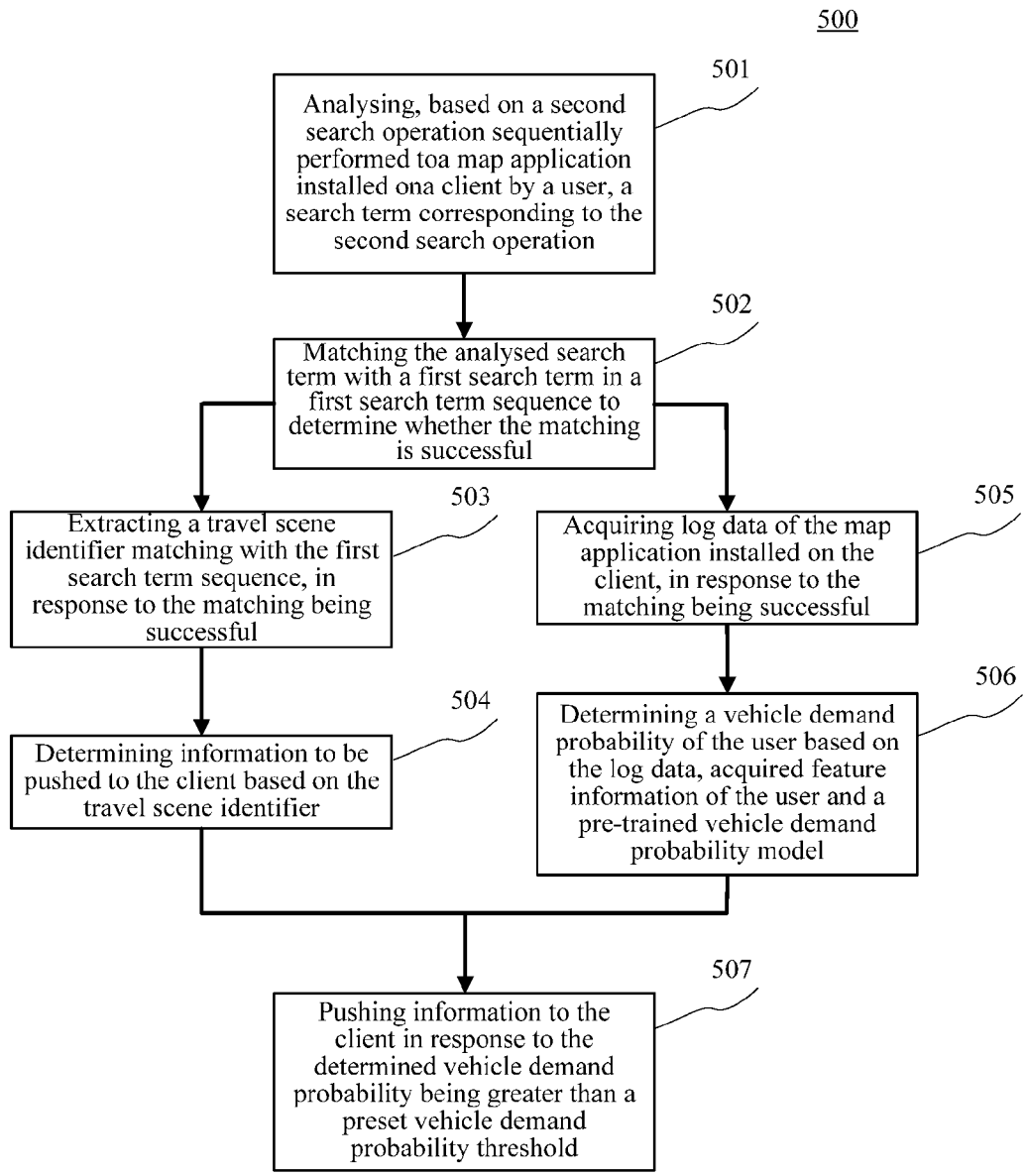
FIG. 5 is a flowchart of another embodiment of the method for pushing information according to the present disclosure.

With further reference to FIG. 5, a flow 500 of another embodiment of the method for pushing information is shown. The flow 500 of the method for pushing information includes the following steps:

Step 501, analysing a search term corresponding to the second search operation, based on a second search operation performed sequentially by a user on a map application installed by a client.

In the present embodiment, an electronic device (e.g., the server 105 as illustrated in FIG. 1) on which the method for pushing information operate may analyse a search term corresponding to the second search operation, based on a second search operation performed sequentially by a user on a map application installed by a client. Here, the second search operation may include an operation of the user inputting a location information in the map application and a click-search operation after the input of the location information. The operation of inputting the location information may be manual input of the location information or speech input of the location information. After the user performing each of the second search operation on the map application installed by the client, the electronic device may acquire, from the client, the location information input by the user when performing the second search operation and the timestamp of the click-search operation, or acquire, from the client, the real-time position information of the user when performing the second search operation.

In the present embodiment, for each of the second search operation performed by the user on the map application installed by the client, the electronic device analyses the search term corresponding to the second search operation by performing the following steps: first, the electronic device may acquire the location information input by the user when performing the second search operation; after that, the electronic device may determine the POI information matched with the location information based on the preset location information and a mapping table of the POI information; finally, the POI information is determined as the search term corresponding to the second search operation.

The specific operation of the step 501 is substantially the same as that of the step 201, therefore detailed description thereof is omitted.

Step 502, matching the analysed search term with a first search term in a first search term sequence to determine whether the matching is successful.

In the present embodiment, the electronic device may pre-acquire a first search term sequence. The first search term sequence may be stored in a database installed in the electronic device. Here, the electronic device may acquire the first search term sequence directly from the local database; the first search term sequence may also be stored in another database connected to the electronic device, wherein the electronic device may look for and acquire the first search term sequence from the other database via a wired connection method or a wireless connection method.

In the present embodiment, the first search term sequence may be generated based on a first search operation sequence applied to the same map application. Here, the first search operation sequence may be a sequence composed of first search operations sequentially performed on the same map application in chronological order. The first search operation performed each time may include an operation of inputting the location information in the same map application and a click-search operation after the input of the location information. It should be noted that the first search operation sequence may be one or a plurality of sequences. Correspondingly, the first search term sequence may also be one or a plurality of sequences.

In the present embodiment, the electronic device may match the search term analysed in step 501 with the first search term in the first search term sequence. Specifically, the electronic device may match the search term corresponding to the second search operation with the search term corresponding to the first search operation of the same sequence with the second search operation in the first search term sequence. The electronic device may determine whether the matching is successful based on the following method:

If the search term corresponding to the second search operation matches with the first search term corresponding to the relevant first search operation in the first search term sequence for each of the second search operations sequentially performed, the electronic device may determine the matching as successful. That is, only the search terms analysed based on each of the second search operations match with the first search term generated based on the first search operation of the same sequence, the matching can be determined as successful.

If the search term corresponding to the second search operation does not match with the first search term corresponding to the relevant first search operation in the first search term sequence, the electronic device may determine the matching as unsuccessful. That is, as long as any of the search terms analysed based on the second search operation does not match with the search terms generated based on the first search operation of the same sequence, the matching may be determined as unsuccessful. When the matching is unsuccessful, the matching of the search terms corresponding to the next second search operation is not further performed.

The specific operation of the step 502 is substantially the same as that of the step 202, therefore detailed description thereof is omitted.

Figure 6:
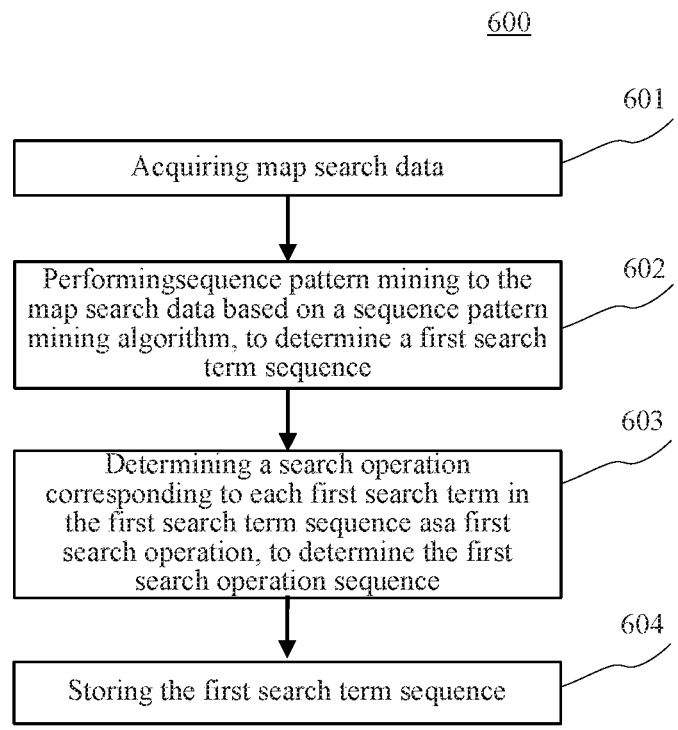
FIG. 6 is a flowchart of an embodiment of generating a first search term sequence according to the present disclosure.

For the first search term sequence in step 502, reference may be made to FIG. 6. FIG. 6 is a flowchart of an embodiment of generating the first search term sequence according to the present disclosure. The first search term sequence generation method 600 may include the following steps:

Step 601, acquiring map search data.

In the present embodiment, the electronic device may acquire the map search data from a map search database installed locally or in another server connected to the electronic device, wherein the map search data may include a search term and a timestamp corresponding to each search operation of a plurality of search operations performed in the map application. The map search data may be acquired from the same map application installed by a client used by multiple users. It should be noted that the search term corresponding to each of the search operations may be a search term generated by the electronic device based on analysing the location information input by the search operation, and the timestamp corresponding to each of the search operations may be a timestamp of the click-search operation in the search operation.

In practice, the map application is installed in a terminal device used by a plurality of users. The search operation performed by each user on the map application installed on the used terminal device includes the operation of inputting the location information and the click-search operation after the input of the location information. The electronic device may acquire the location information and the timestamp corresponding to the search operation, for each search operation performed by the user on the corresponding map application and store them in the map search database.

Step 602, determining a first search term sequence based on a sequence pattern mining algorithm by performing sequence pattern mining to the map search data.

In the present embodiment, the electronic device may first analyze the location information input by each user in the map search data acquired in step 601 to generate a search term corresponding to each of the location information. After that, the electronic device may generate a search term sequence matched with a plurality of users, based on the sequence pattern mining algorithm, wherein each user may match with a plurality of search term sequences, and the search terms in each search term sequence are arranged in chronological order. Then, the electronic device may acquire a minimum support threshold preset by the developer, and determine a frequent sequence from the search term sequence matched with the plurality of users, based on the sequence pattern mining algorithm, wherein the frequent sequence is a sequence with an occurrence frequency not less than the minimum support threshold. Finally, the electronic device may determine the determined frequent sequence as the first search term sequence. In practice, the first search term sequence may be one or more.

It should be noted that the sequence pattern mining algorithm is a well-known technology which has been extensively studied and applied at present, so that detailed description thereof is omitted.

Step 603, determining a search operation corresponding to each of the first search terms in the first search term sequence as a first search operation, and determining a first search operation sequence.

In the present embodiment, for each of the first search terms in the first search term sequence, the electronic device may determine the search operation with the search term generated by analysing the input location information being the first search term as the first search operation corresponding to the first search term. After that, each of the first search operation sequences is determined according to the order of the first search terms in the first search term sequence, wherein the order of each of the first search operations in the first search operation sequence is the same as the order of the corresponding first search terms in the first search term sequence.

Step 604, storing the first search term sequence.

In the present embodiment, the electronic device may store the first search term sequence generated in step 602. In practice, the first search term sequence may be stored locally or in a search term sequence database connected to the electronic device.

With further reference to the flow in FIG. 5, in response to the matching is determined as successful in step 502, the electronic device may perform steps 503 to 504, and steps 505 to 506.

Step 503, extracting a travel scene identifier matched with the first search term sequence, in response to a successful matching.

In the present embodiment, in response to a successful matching in step 502, the electronic device may first acquire a preset travel scene identifier set and a matching relationship between a preset first search term sequence and a travel scene identifier, then extract a travel scene identifier matched with the first search term sequence from the travel scene identifier set, based on the matching relationship between the first search term sequence and the travel scene identifier.

It should be noted that the travel scene identifier may be preset by the developer based on the travel scene represented between the first search terms in the first search term sequence, and each of the first search term sequences matches with a travel scene identifier. For example, the first search terms in the first search term sequence are "hotel" and "airport" in sequence, then the representative travel scene is considered as a business trip scene. The first search terms in the first search term sequence are "house" and "shopping mall" in sequence, then the representative travel scene is considered as a shopping scene. The first search terms in the first search term sequence are "company" and "house" in sequence, then the representative travel scene is considered as an off duty scene. The developer may set a matching travel scene identifier for each travel scene and store each travel scene identifier in the travel scene identifier set, wherein each travel scene identifier may be made up of arbitrary character strings.

Step 504, determining information to be pushed to the client, based on the travel scene identifier.

In the present embodiment, the electronic device may first acquire a preset candidate information set and a matching relationship between a preset travel scene identifier and candidate information, then extract candidate information matched with the travel scene identifier from the candidate information set and determine the extracted candidate information as information to be pushed to the client, based on the matching relationship between the travel scene identifier and the candidate information.

It should be noted that the candidate information may be preset by the developer based on the vehicle demand type inferred from the travel scene indicated by the travel scene identifier and stored in the candidate information set, wherein each travel scene identifier matches with a piece of candidate information. For example, when the travel scene indicated by the travel scene identifier is a business trip scene, the vehicle demand type is assumed to be chauffeured car, and the candidate information matched with the travel scene identifier indicating the business trip scene is set to be the chauffeured car special offer information. When the travel scene indicated by the travel scene identifier is a shopping scene, the vehicle demand type is assumed to be express car, and the candidate information matched with the travel scene identifier indicating the shopping scene is set to be the express car special offer information. When the travel scene indicated by the travel scene identifier is an off duty scene, the vehicle demand type is assumed to be hitchhike, and the candidate information matched with the travel scene identifier indicating the off duty scene is set to be the hitchhike special offer information.

Step 505, acquiring log data of the map application installed by the client, in response to a successful matching.

In the present embodiment, the electronic device may acquire log data of the map application installed by the client in step 501, in response to a successful matching determined in step 502. In practice, the log data may include, but is not limited to the coordinates of the current location of the user, the coordinates of the destination, the distance of the current location of the user to the destination, the current time, etc.

Step 506, determining a vehicle demand probability of the user based on the log data, the acquired feature information of the user and a pre-trained vehicle demand probability model.

In the present embodiment, the electronic device may first acquire feature information of the user from the various applications installed locally or by the client, for example, the age, sex, consumption level of the user, etc. Then, the pre-trained vehicle demand probability model may be loaded. Finally, it is possible to determine the user's vehicle demand probability based on the log data acquired in step 203, the acquired feature information of the user and the pre-trained vehicle demand probability model. It should be noted that the vehicle demand probability model may be used to characterize a correspondence relationship between the log data, the feature information and the vehicle demand probability.

In the present embodiment, based on the log data, the acquired feature information of the user and the pre-trained vehicle demand probability model acquired in step 505, the vehicle demand probability of the user may be determined according to the following steps: first, the electronic device may select a preset type of data from the log data and the feature information; after that, the electronic device may process the selected data (for example, data type conversion, scaling, etc.) to obtain the processed data; then the electronic device may constitute a feature vector with the processed data, wherein the feature vector may include a plurality of numerical values; finally, the electronic device may introduce the feature vector into the pre-trained vehicle demand probability model to determine the vehicle demand probability of the user.

In the present embodiment, the pre-trained vehicle demand probability model is obtained through the following steps: first, the electronic device may acquire the feature information and the vehicle demand probability of a plurality of users; after that, the electronic device may acquire the log data of the map application matched with the user in a historical setting duration from the client used by each user of the plurality of users, wherein the map application is identical to the map application in step 501; then, for each user, the electronic device may extract a feature vector matched with the user from the feature information of the user and the log data matched with the user; finally, for each user, the electronic device may train the vehicle demand probability model with the feature vector matched with the user as an input and the vehicle demand probability of the user as an output.

Step 507, pushing information to the client in response to the vehicle demand probability greater than a preset vehicle demand probability threshold.

In the present embodiment, the preset vehicle demand probability threshold may be stored in the electronic device. In response to the determined vehicle demand probability of the user in step 506 greater than the vehicle demand probability threshold, the electronic device may push information to be pushed to the client determined in step 504 to the client used by the user.

In the present embodiment, after the information is pushed to the client, the electronic device may acquire the user identifier of the user and store the user identifier to the pushed user identifier list. In a preset duration, no information is pushed to the client used by the user indicated by the user identifier.

As can be seen from FIG. 5, the flow 500 of the information pushing method in the present embodiment highlights the selection step of the travel scene identifier and the selection step of the information to be pushed to the client, as compared with the embodiment corresponding to FIG. 2. Thus, the solution described in the present embodiment can select matched information based on the current travel scene of the user, make the pushed information more reasonable, and further realize the targeted information pushing.

Figure 7:
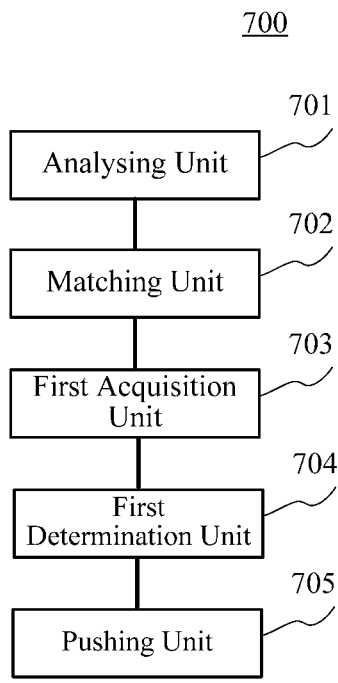
FIG. 7 is a schematic structural diagram of an embodiment of an apparatus for pushing information according to the present disclosure.

With further reference to FIG. 7, as an implementation of the method shown in the above figures, the present disclosure provides an embodiment of an apparatus for pushing information. The apparatus embodiment corresponds to the method embodiment shown in FIG. 2, and may be specifically applied to various electronic devices.

As shown in FIG. 7, the apparatus 700 for pushing information of the present embodiment comprises: an analysing unit 701, configured to analyse, based on a second search operation sequentially performed to a map application installed on a client by a user, a search term corresponding to the second search operation; a matching unit 702, configured to match the analysed search term with the search term in a first search term sequence to determine whether the matching is successful, wherein the first search term sequence is generated based on a first search operation sequence for the same map application; a first acquisition unit 703, configured to acquire log data of the map application installed on the client, in response to the matching being successful; a first determination unit 704, configured to determine a vehicle demand probability of the user based on the log data, the acquired feature information of the user and a pre-trained vehicle demand probability model, wherein the vehicle demand probability model is used to characterize a correspondence relationship between the log data, the feature information and the vehicle demand probability; and a pushing unit 705, configured to push information to the client in response to the vehicle demand probability being greater than a preset vehicle demand probability threshold.

In the present embodiment, the analysing unit 701 of the apparatus 700 for pushing information may analyse a search term corresponding to the second search operation, based on a second search operation performed sequentially by a user on a map application installed by a client. Here, the second search operation may include an operation of the user inputting location information in the map application and a click-search operation after the input of the location information. The operation of inputting the location information may be manual input of the location information or speech input of the location information.

In the present embodiment, after the user performing each of the second search operation on the map application installed by the client, the analysing unit 701 may acquire, from the client, the location information input by the user when performing the second search operation and the timestamp of the click-search operation, or acquire, from the client, the real-time position information of the user when performing the second search operation. The real-time position information may be extracted from the operation data of the map application based on the real-time positioning function of the map application, or may be acquired based on the real-time positioning function turned on by other applications installed by the client.

In the present embodiment, for each of the second search operation performed by the user on the map application installed by the client, the analysing unit 701 analyses the search term corresponding to the second search operation by performing the following steps: first, the analysing unit 701 may acquire the location information input by the user when performing the second search operation; after that, the analysing unit 701 may determine the POI information matched with the location information based on the preset location information and a mapping table of the POI information; finally, the POI information is determined as the search term corresponding to the second search operation.

In some alternative implementations of the present embodiment, the apparatus 700 for pushing information may also include a second acquisition unit, a mining unit, a second determination unit and a first storing unit (not shown in the figure). The second acquisition unit is configured to acquire map search data, wherein the map search data includes a search term and a timestamp corresponding to each search operation of a plurality of search operations performed in the map application. The mining unit is configured to determine a first search term sequence based on a sequence pattern mining algorithm by performing sequence pattern mining to the map search data. The second determination unit is configured to determine a search operation corresponding to each of the first search terms in the first search term sequence as a first search operation, and determine a first search operation sequence. The first storing unit is configured to store the first search term sequence.

In the present embodiment, the matching unit 702 may match the search term analysed by the analysing unit 701 with the first search term in the first search term sequence. Specifically, the matching unit 702 may match the search term corresponding to the second search operation with the search term corresponding to the first search operation of the same sequence with the second search operation in the first search term sequence.

In some alternative implementations of the present embodiment, the matching unit 702 may be further configured to determine the matching as successful, if the search term corresponding to the second search operation matches with the first search term corresponding to the relevant first search operation in the first search term sequence for each of the second search operations sequentially performed.

In some alternative implementations of the present embodiment, the matching unit 702 may be further configured to determine the matching as unsuccessful, if the search term corresponding to the second search operation does not match with the first search term corresponding to the relevant first search operation in the first search term sequence.

In some alternative implementations of the present embodiment, the apparatus may further include a third acquisition unit, a first extraction unit, a fourth acquisition unit and a second extraction unit (not shown in the figure). The third acquisition unit may be configured to acquire a preset travel scene identifier set and a matching relationship between a preset first search term sequence and a travel scene identifier, in response to a successful matching. The first extraction unit may be configured to extract a travel scene identifier matched with the first search term sequence from the travel scene identifier set, based on the matching relationship between the first search term sequence and the travel scene identifier. The fourth acquisition unit may be configured to acquire a preset candidate information set and a matching relationship between a preset travel scene identifier and candidate information. The second extraction unit may be configured to extract candidate information matched with the travel scene identifier from the candidate information set and determine the extracted candidate information as information to be pushed to the client, based on the matching relationship between the travel scene identifier and the candidate information.

In the present embodiment, the first acquisition unit 703 may acquire log data of the map application installed by the client, in response to a successful matching determined by the matching unit 702. In practice, the log data may include, but is not limited to the coordinates of the current location of the user, the coordinates of the destination, the distance of the current location of the user to the destination, the current time, etc.

In the present embodiment, the first determination unit 704 may first acquire feature information of the user from the various applications installed locally or by the client, for example, the age, sex, consumption level of the user, etc. Then, the pre-trained vehicle demand probability model may be loaded. Finally, it is possible to determine the user's vehicle demand probability based on the log data acquired in step 203, the acquired feature information of the user and the pre-trained vehicle demand probability model. It should be noted that the vehicle demand probability model may be used to characterize a correspondence relationship between the log data, the feature information and the vehicle demand probability.

In some alternative implementations of the present embodiment, the first determination unit 704 may be further configured to extract a feature vector from the log data and the pre-acquired feature information of the user, and introduce the feature vector into a pre-trained vehicle demand probability model to determine the vehicle demand probability of the user.

In some alternative implementations of the present embodiment, the vehicle demand probability model may be acquired through a fifth acquisition unit, a sixth acquisition unit, a third extraction unit and a training unit (not shown in the figure). The fifth acquisition unit may be configured to acquire the feature information and the vehicle demand probability of a plurality of users. The sixth acquisition unit may be configured to acquire log data matched with the plurality of users in a historical setting duration from the map application. The third extraction unit may be configured to extract a feature vector matched with each of the plurality of users from the acquired feature information of the plurality of users and the log data. The training unit may be configured to train the vehicle demand probability model with the extracted feature vector as an input and the acquired vehicle demand probability as an output.

In the present embodiment, the preset vehicle demand probability threshold may be stored in the pushing unit 705. In response to the vehicle demand probability of the user determined by the first determination unit 704 greater than the vehicle demand probability threshold, information may be pushed to the client used by the user. It should be noted that the information may be various information, for example, chauffeured car special offer information, express car special offer information, carpool special offer information, hitchhike special offer information, etc.

In some alternative implementations of the present embodiment, the apparatus may further include a seventh acquisition unit and a second storing unit. The seventh acquisition unit may be configured to acquire a user identifier with the user. The second storing unit may be configured to store the user identifier to a pushed user identifier list.

By the analysing unit 701 analysing the search term corresponding to the second search operation performed by the user on the map application, then the matching unit 702 matching the analysed search term with the first search term in the first search term sequence, upon a successful matching, the first acquisition unit 703 acquiring log data of the map application, then the first determination unit 704 determining the vehicle demand probability of the user based on the log data, the extracted feature information of the user and the pre-trained vehicle demand probability model, and finally the pushing unit 705 pushing information to the client if the vehicle demand probability of the user is greater than the preset vehicle demand probability threshold, the apparatus provided by the embodiment of the present disclosure achieves a targeted information pushing.

Figure 8:
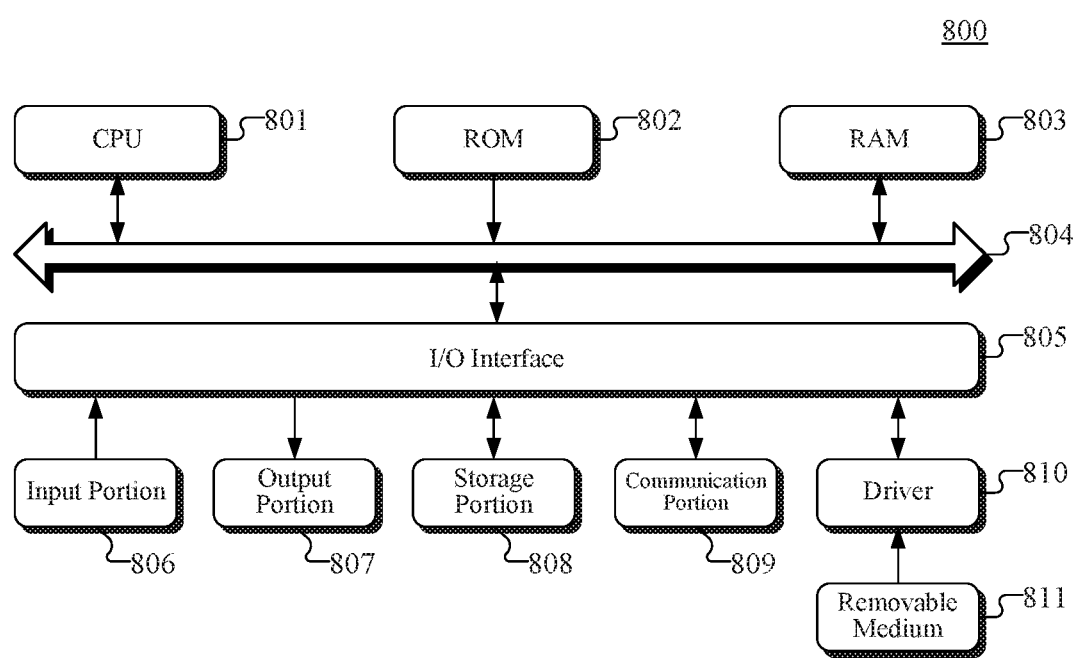
FIG. 8 is a schematic structural diagram of a computer system adapted to implement a terminal device or server according to embodiments of the present disclosure.

Referring to FIG. 8, a schematic structural diagram of a computer system 800 adapted to implement a server of the embodiments of the present application is shown.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 809, and/or may be installed from the removable media 811. The computer program, when executed by the central processing unit (CPU) 801, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an analysing unit, a matching unit, a first acquisition unit, a first determination unit and a pushing unit, where the names of these units or modules are not considered as a limitation to the units or modules. For example, the analysing unit may also be described as "a unit for analysing, based on a second search operation sequentially performed to a map application installed on a client by a user, a search term corresponding to the second search operation."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: analysing, based on a second search operation sequentially performed to a map application installed on a client by a user, a search term corresponding to the second search operation; matching the analysed search term with a first search term in a first search term sequence to determine whether the matching is successful, wherein the first search term sequence is generated based on a first search operation sequence for the map application; acquiring log data of the map application installed on the client, in response to the matching being successful; determining a vehicle demand probability of the user based on the log data, acquired feature information of the user and a pre-trained vehicle demand probability model, wherein the vehicle demand probability model is used to characterize a correspondence relationship between the log data, the feature information and the vehicle demand probability; and pushing information to the client in response to the determined vehicle demand probability being greater than a preset vehicle demand probability threshold.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for pushing information, comprising:
    analysing, based on a second search operation sequentially performed to a map application installed on a client by a user, a search term corresponding to the second search operation;
    matching the analysed search term with a first search term in a first search term sequence to determine whether the matching is successful, wherein the first search term sequence is generated based on a first search operation sequence for the map application;
    acquiring log data of the map application installed on the client, in response to the matching being successful;
    determining a vehicle demand probability of the user based on the log data, acquired feature information of the user and a pre-trained vehicle demand probability model, the vehicle demand probability model being used to characterize a correspondence relationship between the log data, the feature information and the vehicle demand probability; and
    pushing information to the client in response to the determined vehicle demand probability being greater than a preset vehicle demand probability threshold.

2. The method for pushing information according to claim 1, before the analysing a search term corresponding to the second search operation based on the second search operation, the method further comprising:
    acquiring map search data, wherein the map search data includes a search term and a timestamp corresponding to each search operation of a plurality of search operations performed in the map application;
    performing sequence pattern mining to the map search data based on a sequence pattern mining algorithm, to determine a first search term sequence;
    determining a search operation corresponding to each first search term in the first search term sequence as a first search operation, to determine the first search operation sequence; and
    storing the first search term sequence.

3. The method for pushing information according to claim 1, wherein the matching the analysed search term with a first search term in a first search term sequence to determine whether the matching is successful comprises:
    for every second search operation sequentially performed, if the search term corresponding to the second search operation matches the first search term corresponding to the first search operation in the first search term sequence, determining the matching being successful.

4. The method for pushing information according to claim 1, wherein the matching the analysed search term with a first search term in a first search term sequence to determine whether the matching is successful comprises:
    if the search term corresponding to the second search operation does not match with the first search term corresponding to the first search operation in the first search term sequence, determining the matching being unsuccessful.

5. The method for pushing information according to claim 1, further comprising:
    acquiring a preset travel scene identifier set and a matching relationship between a preset first search term sequence and a travel scene identifier, in response to determining the matching being successful;
    extracting a travel scene identifier matching the first search term sequence from the travel scene identifier set based on the matching relationship between the first search term sequence and the travel scene identifier;
    acquiring a preset candidate information set and a matching relationship between a preset travel scene identifier and candidate information; and
    extracting the candidate information matching the travel scene identifier from the candidate information set based on the matching relationship between the travel scene identifier and the candidate information, and determining the extracted candidate information as information to be pushed to the client.

6. The method for pushing information according to claim 1, wherein the determining a vehicle demand probability of the user based on the log data, acquired feature information of the user and a pre-trained vehicle demand probability model comprises:
    extracting a feature vector from the log data and the acquired feature information of the user; and
    introducing the feature vector into a pre-trained vehicle demand probability model to determine the vehicle demand probability of the user.

7. The method for pushing information according to claim 1, wherein the vehicle demand probability model is obtained through the following steps:
    acquiring the feature information and the vehicle demand probability of a plurality of users;
    acquiring log data matching the plurality of users in a historical setting duration from the map application;
    extracting a feature vector matching each of the plurality of users from the acquired feature information of the plurality of users and the log data; and
    training the vehicle demand probability model by using the extracted feature vector as an input and using the acquired vehicle demand probability as an output.

8. The method for pushing information according to claim 1, after the pushing information to the client, the method further comprises:
acquiring a user identifier associated with the user; and
storing the user identifier to a pushed user identifier list.

9. An apparatus for pushing information, comprising:
at least one processor; and
a memory storing instructions, which when executed by the at least one processor, cause the at least one processor to perform operations, the operations comprising:
analysing, based on a second search operation sequentially performed to a map application installed on a client by a user, a search term corresponding to the second search operation;
matching the analysed search term with the search term in a first search term sequence to determine whether the matching is successful, wherein the first search term sequence is generated based on a first search operation sequence for the map application;
acquiring log data of the map application installed on the client, in response to the matching being successful;
determining a vehicle demand probability of the user based on the log data, acquired feature information of the user and a pre-trained vehicle demand probability model, the vehicle demand probability model being used to characterize a correspondence relationship between the log data, the feature information and the vehicle demand probability; and
pushing information to the client in response to the determined vehicle demand probability being greater than a preset vehicle demand probability threshold.

10. The apparatus for pushing information according to claim 9, the operations further comprising:
acquiring map search data, wherein the map search data includes a search term and a timestamp corresponding to each search operation of a plurality of search operations performed in the map application;
performing sequence pattern mining to the map search data based on a sequence pattern mining algorithm, to determine a first search term sequence;
determining a search operation corresponding to each first search term in the first search term sequence as a first search operation, to determine the first search operation sequence; and
storing the first search term sequence.

11. The apparatus for pushing information according to claim 9, the operations further comprising:
for every second search operation sequentially performed, if the search term corresponding to the second search operation matches with the first search term corresponding to the first search operation in the first search term sequence, determining the matching being successful.

12. The apparatus for pushing information according to claim 9, the operations further comprising:
if the search term corresponding to the second search operation does not match with the first search term corresponding to the first search operation in the first search term sequence, determining the matching being unsuccessful.

13. The apparatus for pushing information according to claim 9, the operations further comprising:
acquiring a preset travel scene identifier set and a matching relationship between a preset first search term sequence and a travel scene identifier, in response to determining the matching being successful;
extracting a travel scene identifier matching the first search term sequence from the travel scene identifier set based on the matching relationship between the first search term sequence and the travel scene identifier;
acquiring a preset candidate information set and a matching relationship between a preset travel scene identifier and candidate information; and
extracting the candidate information matching the travel scene identifier from the candidate information set based on the matching relationship between the travel scene identifier and the candidate information, and determining the extracted candidate information as information to be pushed to the client.

14. The apparatus for pushing information according to claim 9, the operations further comprising:
extracting a feature vector from the log data and the pre-acquired feature information of the user; and
introducing the feature vector into a pre-trained vehicle demand probability model to determine the vehicle demand probability of the user.

15. The apparatus for pushing information according to claim 9, the vehicle demand probability model is obtained by the following operation:
acquiring the feature information and the vehicle demand probability of a plurality of users;
acquiring log data matching the plurality of users in a historical setting duration from the map application;
extracting a feature vector matching each of the plurality of users from the acquired feature information of the plurality of users and the log data; and
training the vehicle demand probability model by using the extracted feature vector as an input and using the acquired vehicle demand probability as an output.

16. The apparatus for pushing information according to claim 9, the operations further comprising:
acquiring a user identifier associated with the user; and
storing the user identifier to a pushed user identifier list.

17. A non-transitory computer storage medium storing a computer program, which when executed by one or more processors, cause the one or more processors to perform operations, the operations comprising:
analysing, based on a second search operation sequentially performed to a map application installed on a client by a user, a search term corresponding to the second search operation;
matching the analysed search term with a first search term in a first search term sequence to determine whether the matching is successful, the first search term sequence being generated based on a first search operation sequence for the map application;
acquiring log data of the map application installed on the client, in response to the matching being successful;
determining a vehicle demand probability of the user based on the log data, acquired feature information of the user and a pre-trained vehicle demand probability model, wherein the vehicle demand probability model is used to characterize a correspondence relationship between the log data, the feature information and the vehicle demand probability; and
pushing information to the client in response to the determined vehicle demand probability being greater than a preset vehicle demand probability threshold.

* * * * *